(12) United States Patent
Hanada et al.

(10) Patent No.: US 9,359,719 B2
(45) Date of Patent: Jun. 7, 2016

(54) SELF-CROSSLINKABLE POLYSILOXANE-MODIFIED POLYHYDROXY POLYURETHANE RESIN, PROCESS FOR PRODUCING SAID RESIN, RESIN MATERIAL COMPRISING SAID RESIN, AND ARTIFICIAL LEATHER PRODUCED UTILIZING SAID RESIN

(75) Inventors: Kazuyuki Hanada, Tokyo (JP); Kazuya Kimura, Tokyo (JP); Kenichi Takahashi, Tokyo (JP); Manabu Uruno, Tokyo (JP)

(73) Assignees: DAINICHISEIKA COLOR & CHEMICALS MFG. CO., LTD., Tokyo (JP); UKIMA CHEMICALS & COLOR MFG. CO., LTD., Tokyo (JP)

( * ) Notice: Subject to any disclaimer, the term of this patent is extended or adjusted under 35 U.S.C. 154(b) by 353 days.

(21) Appl. No.: 14/009,464

(22) PCT Filed: Apr. 2, 2012

(86) PCT No.: PCT/JP2012/058911
§ 371 (c)(1),
(2), (4) Date: Oct. 2, 2013

(87) PCT Pub. No.: WO2012/137726
PCT Pub. Date: Oct. 11, 2012

(65) Prior Publication Data
US 2014/0024274 A1    Jan. 23, 2014

(30) Foreign Application Priority Data

Apr. 4, 2011 (JP) ................................. 2011-083139
Feb. 20, 2012 (JP) ................................. 2012-033663

(51) Int. Cl.
| | | |
|---|---|---|
| C08G 18/58 | (2006.01) |
| C08G 18/61 | (2006.01) |
| C08G 18/72 | (2006.01) |
| C09D 175/04 | (2006.01) |
| D06N 3/14 | (2006.01) |
| C08L 83/04 | (2006.01) |
| C08G 18/78 | (2006.01) |
| C08G 18/80 | (2006.01) |
| C08G 59/14 | (2006.01) |
| C08G 18/38 | (2006.01) |

(52) U.S. Cl.
CPC .............. *D06N 3/14* (2013.01); *C08G 18/3893* (2013.01); *C08G 18/58* (2013.01); *C08G 18/61* (2013.01); *C08G 18/7825* (2013.01); *C08G 18/8022* (2013.01); *C08G 18/8074* (2013.01); *C08G 18/8077* (2013.01); *C08G 59/1438* (2013.01); *C08L 83/04* (2013.01); *C09D 175/04* (2013.01); *D06N 2209/06* (2013.01); *D06N 2209/105* (2013.01); *D06N 2209/143* (2013.01); *D06N 2209/1685* (2013.01); *D06N 2211/28* (2013.01); *Y10T 442/20* (2015.04)

(58) Field of Classification Search
CPC .... C08G 18/58; C08G 18/61; C08G 18/7825; C09D 175/04; D06N 3/14; D06N 3/142; D06N 2211/28; C08L 83/04; Y10T 442/20; Y10S 428/904
USPC .......... 428/424.8, 904; 442/59; 524/500, 588, 524/590; 528/28; 525/453
See application file for complete search history.

(56) References Cited

U.S. PATENT DOCUMENTS

| 3,072,613 A | 1/1963 | Whelan et al. |
| 4,299,868 A | 11/1981 | Berndt et al. |
| 4,480,009 A | 10/1984 | Berger |

(Continued)

FOREIGN PATENT DOCUMENTS

| EP | 390777 | 10/1990 |
| EP | 1143063 | 10/2001 |

(Continued)

OTHER PUBLICATIONS

Zhu et al.: "New polysiloxanes bearing cyclic carbonate side chains: synthesis and ionic conductivity studies"; Polymer Preprints (1994) vol. 35, No. 1, p. 496-497—2 pages.
Zhu et al.: "Synthesis of Polysiloxanes Bearing Cyclic Carbonate Side Chains. Dielectric Properties and Ionic Conductivities of Lithium Triflate Complexes"; Macromolecules (1994) vol. 27, No. 15, p. 4076-4079—4 pages.
Lang et al.(2009): STN International HCAPLUS database, Columbus (OH), accession No. 2009: 1141958.
Kihara et al.: "Catalytic Activity of Various Salts in the Reaction of 2,3-Epoxypropyl Phenyl Ether and Carbon Dioxide under Atmospheric Pressure"; J. Org. Chem. 58 (1993), pp. 6198-6202.

(Continued)

*Primary Examiner* — Bruce H Hess
(74) *Attorney, Agent, or Firm* — Hamre, Schumann, Mueller & Larson, P.C.

(57) ABSTRACT

A problem is to provide, in the field of polyhydroxy polyurethane resins the development of applications of which has not moved ahead by conventional technologies, a self-crosslinking polyhydroxy polyurethane resin, which enables to provide products, such as imitation leathers, excellent in abrasion resistance, chemical resistance, heat resistance and the like, and moreover, which is useful from the viewpoint of a reduction in greenhouse gas, contains carbon dioxide incorporated and fixed therein, and is responsive to environmental conservation. Provided are a self-crosslinking, polysiloxane-modified, polyhydroxy polyurethane resin having masked isocyanate groups in a structure of a polysiloxane-modified, polyhydroxy polyurethane resin derived from a reaction of a 5-membered cyclic carbonate compound and an amine-modified polysiloxane compound and having polysiloxane segments therein; a production process of the self-crosslinking resin; a resin material containing the self-crosslinking resin; and an imitation leather composed of a base fabric and a resin composition composed of the self-crosslinking resin as its principal component and impregnated in or laminated on the base fabric.

13 Claims, No Drawings

(56) References Cited

U.S. PATENT DOCUMENTS

| | | | |
|---|---|---|---|
| 4,484,994 | A | 11/1984 | Jacobs et al. |
| 4,499,149 | A | 2/1985 | Berger |
| 4,520,167 | A | 5/1985 | Blank et al. |
| 4,631,320 | A | 12/1986 | Parekh et al. |
| 4,758,632 | A | 7/1988 | Parekh et al. |
| 4,806,611 | A | 2/1989 | Honel et al. |
| 4,883,854 | A | 11/1989 | Coury et al. |
| 4,895,829 | A | 1/1990 | Hanada et al. |
| 4,897,435 | A | 1/1990 | Jacobs et al. |
| 4,910,087 | A | 3/1990 | Torii et al. |
| 5,237,021 | A | 8/1993 | Ishii et al. |
| 5,324,797 | A | 6/1994 | Ishii et al. |
| 5,606,077 | A | 2/1997 | Lersch et al. |
| 5,686,547 | A | 11/1997 | Nye |
| 6,120,905 | A | 9/2000 | Figovsky |
| 6,379,751 | B1 | 4/2002 | Shäfer et al. |
| 6,784,300 | B2 | 8/2004 | Cetin et al. |
| 2006/0276599 | A1 | 12/2006 | DeWitt et al. |
| 2007/0059597 | A1 | 3/2007 | Nakanishi et al. |
| 2007/0134502 | A1 | 6/2007 | Fonda |
| 2007/0135588 | A1 | 6/2007 | Diakoumakos et al. |
| 2008/0026154 | A1 | 1/2008 | Jones et al. |
| 2009/0018302 | A1 | 1/2009 | Laas et al. |
| 2010/0210809 | A1 | 8/2010 | Simon et al. |
| 2011/0039948 | A1 | 2/2011 | Lange et al. |
| 2012/0231184 | A1 | 9/2012 | Hanada et al. |
| 2012/0232289 | A1 | 9/2012 | Hanada et al. |
| 2012/0237701 | A1 | 9/2012 | Hanada et al. |
| 2013/0171896 | A1 | 7/2013 | Hanada et al. |

FOREIGN PATENT DOCUMENTS

| | | |
|---|---|---|
| EP | 2505600 | 10/2012 |
| EP | 2610276 | 7/2013 |
| JP | 56-4408 | 1/1981 |
| JP | 58-13359 B | 3/1983 |
| JP | 61-227087 | 10/1986 |
| JP | 62-202786 | 9/1987 |
| JP | 63-166854 | 7/1988 |
| JP | 2-102096 | 4/1990 |
| JP | 3-501121 | 3/1991 |
| JP | 5-65341 | 3/1993 |
| JP | 06-025604 | 2/1994 |
| JP | 06-247151 | 9/1994 |
| JP | 7-10991 | 1/1995 |
| JP | 8-109349 | 4/1996 |
| JP | 8-225670 | 9/1996 |
| JP | 8-245787 | 9/1996 |
| JP | 8-245791 | 9/1996 |
| JP | 9-278982 | 10/1997 |
| JP | 10-67857 | 3/1998 |
| JP | 10-251405 | 9/1998 |
| JP | 11-140182 | 5/1999 |
| JP | 2000-319504 | 11/2000 |
| JP | 2001-234071 | 8/2001 |
| JP | 2002-114936 | 4/2002 |
| JP | 2002-518532 | 6/2002 |
| JP | 2004-51901 | 2/2004 |
| JP | 2005-154580 | 6/2005 |
| JP | 2005-336637 | 12/2005 |
| JP | 2006-176615 | 7/2006 |
| JP | 2006-307015 | 11/2006 |
| JP | 2006-336015 | 12/2006 |
| JP | 2007-501886 | 2/2007 |
| JP | 2007-77075 | 3/2007 |
| JP | 2007-270373 | 10/2007 |
| JP | 2007-297544 | 11/2007 |
| JP | 2008-502765 | 1/2008 |
| JP | 2008-56772 | 3/2008 |
| JP | 2008-297552 | 12/2008 |
| JP | 2009-30050 | 2/2009 |
| JP | 2009-520082 | 5/2009 |
| JP | 2009-144313 | 7/2009 |
| JP | 2009-155407 | 7/2009 |
| JP | 2011-132509 | 7/2011 |
| KR | 1986-0002192 B | 12/1986 |
| WO | WO 89/00565 | 1/1989 |
| WO | WO 2008/142109 | 11/2008 |
| WO | WO 2009/112418 | 9/2009 |
| WO | WO 2011/065129 | 6/2011 |
| WO | WO 2011/065432 | 6/2011 |
| WO | WO 2011/065433 | 6/2011 |
| WO | WO 2011/162237 | 12/2011 |
| WO | WO 2012/026338 | 3/2012 |

OTHER PUBLICATIONS

Kihara et al.: Synthesis and Properties of Poly(hydroxyurethane)s, J. Polymer Sci., Part A Polymer Chem., 31(11), (1993), pp. 2765-2773.
Extended European Search Report, Mar. 25, 2015; European Patent Application No. 11798121.7 (4 pages).

SELF-CROSSLINKABLE POLYSILOXANE-MODIFIED POLYHYDROXY POLYURETHANE RESIN, PROCESS FOR PRODUCING SAID RESIN, RESIN MATERIAL COMPRISING SAID RESIN, AND ARTIFICIAL LEATHER PRODUCED UTILIZING SAID RESIN

TECHNICAL FIELD

This invention relates to a novel self-crosslinking, polysiloxane-modified, polyhydroxy polyurethane resin, a novel production process of the resin, a novel resin material containing the resin, and a novel imitation leather making use of the resin. More specifically, the present invention is concerned with a technology for providing a self-crosslinking, polysiloxane-modified, polyhydroxy polyurethane resin, which can provide products excellent in lubricity, abrasion resistance, chemical resistance, non-tackiness and heat resistance when employed as a resin material upon forming film and molding materials, various coating materials, diverse binders and the like, and moreover, which is also useful from the viewpoint of preventing destruction of the global environment because of the use of carbon dioxide as a production raw material for the resin. The present invention also relates to a utilization technology for the resin, that enables to provide an imitation leather, which is excellent in hand feeling, lubricity, scratch resistance, abrasion resistance, chemical resistance and heat resistance, and moreover, is useful from the viewpoint of preventing destruction of the global environment, by using a resin composition composed, as a principal component, of the resin.

BACKGROUND ART

Polyhydroxy polyurethane resins, which make use of carbon dioxide as a production raw material, are known for some time (see, for example, Patent Documents 1 and 2). Under the current situation, however, the development of their applications has not moved ahead, because these polyhydroxy polyurethane resins are evidently inferior in properties to polyurethane-based resins comparable as high-molecular compounds of similar type.

On the other hand, the global warming phenomenon which can be considered to be attributable to the ever-increasing emission of carbon dioxide has become a worldwide problem in recent years, and a reduction in carbon dioxide emissions has arisen as a critical technical issue for the entire world. The change to renewable resources such as biomass and methane has also become a worldwide trend from the viewpoint of the problem of exhaustible fossil resources (petroleum) (for example, Non-patent Documents 1 and 2).

Under the above-described background, the present inventors put a fresh look on the above-described polyhydroxy polyurethane resins, and have come to realize that the provision of a technology capable of enabling the development of applications of these resins is very effective. Described specifically, carbon dioxide which is a raw material for such polyhydroxy polyurethane resins is a readily-available and sustainable carbon resource, and therefore, the provision of a technology that makes effective use of plastics, in which carbon dioxide has been used as a raw material and is fixed, can find utility as an effective means for resolving problems such as warming and resource depletion which the earth confronts in recent years. The use, if possible, of polyhydroxy polyurethane resins, which can use carbon dioxide as a raw material, for example, in below-described products in which imitation leathers are used will be extremely effective because these products are used in large quantities.

Conventionally, imitation leathers have been widely used in pouches, bags, shoes, furniture, clothing, vehicle interior trim materials, electric appliances, and the like. As resins for these imitation leathers, said resins being useful upon production of these products, polyurethane-based resins are extensively used. It is to be noted that the term "imitation leather" is a generic term for leather-like products manufactured resembling natural leathers. In general, imitation leathers can be roughly divided into artificial leathers, synthetic leathers, and vinyl chloride leathers.

Artificial leathers have a structure closest to that of natural leathers among imitation leathers, and use a non-woven fabric as a base fabric in general. As a common process for the production of an artificial leather, there is, for example, a process to be described hereinafter. After a nonwoven fabric is first impregnated with a solution of a polyurethane-based resin in dimethylformamide (hereinafter abbreviated as "DMF"), the polyurethane-based resin is solidified and dried into a porous form by wet-process film formation (submerged solidification). Subsequently, using it as a base material, its surface may be coated or laminated further with a polyurethane-based resin to provide a surface layer such that a smooth tone is presented, or its surface may be ground to raise fibers such that a suede tone is presented.

On the other hand, synthetic leathers use, as a base fabric, a fabric such as a woven fabric or raised blanket, and depending on their manufacturing processes, are roughly divided into dry-process synthetic leathers and wet-process synthetic leathers in general. For the production of a dry-process synthetic leather, there are two processes, one being to coat a polyurethane-based resin directly on a base fabric and to dry it, and the other to coat a polyurethane-based resin on a sheet of release paper, to dry the polyurethane-based resin into a film, and then to bond the film and a base fabric together with an adhesive. On the other hand, a wet-process synthetic leather can be obtained by impregnating or coating a base fabric with a solution of a polyurethane-based resin in DMF, said solution being similar to that used in the above-described production of the artificial leather, and then subjecting the polyurethane-based resin to submerged solidification and drying to form a porous layer. Further, the dry-process synthetic leather and wet-process synthetic leather obtained as described above may each be coated at a surface thereof with a polyurethane-based resin or provided at a surface thereof with a laminated layer of the resin to present a smooth tone, or may each be ground at a surface thereof to raise fibers such that a suede tone is presented.

As mentioned above, the reduction of carbon dioxide emissions has become a critical worldwide issue. In the field of imitation leathers, more and more makers are also positively working on environmental measures, resulting in a move toward forming imitation leather products by using materials excellent in environmental conservation properties. A great deal of research is hence under way, for example, to reduce VOC (volatile organic compound) emissions as much as possible by using polyurethane-based resins, which are dispersible or emulsifiable in water-based media, in place of polyurethane resins that need to use an organic solvent, or to use plant-derived raw materials as production raw materials from the view point of carbon neutral. However, all the resulting imitation leather products are still different in performance compared with the conventional products, and therefore, are considered to have problems for practical applications. Moreover, these approaches are still insufficient in respect to the realization of the conservation of the current environment on the global scale (Patent Documents 3 to 5).

PRIOR ART DOCUMENTS

Patent Documents

Patent Document 1: U.S. Pat. No. 3,072,613
Patent Document 2: JP-A-2000-319504
Patent Document 3: JP-A-2009-144313
Patent Document 4: JP-A-2007-270373
Patent Document 5: JP-A-2005-154580

Non-Patent Documents

Non-patent Document 1: N. Kihara, T. Endo, J. Org. Chem., 58, 6198 (1993)
Non-patent Document 2: N. Kihara, T. Endo, J. Polymer Sci., Part A Polymer Chem., 31(11), 2765 (1993)

DISCLOSURE OF THE INVENTION

Problem to Be Solved by the Invention

To enable using polyhydroxy polyurethane resins for industrial applications as mentioned above, however, they need to be provided with a new additional value, to say nothing of improved performance, so that they can be used like fossil plastics of similar type. Described specifically, there is an outstanding desire for the development of a resin improved in performance indispensable as an industrial material, such as still higher heat resistance, chemical resistance and abrasion resistance, in addition to the viewpoint of the protection of the global environment.

Further, for the utilization of a new resin in imitation leather products, it is desired to development an environment-responsive imitation leather product, which is not inferior in performance to conventional imitation leather products, is still better in surface scratch resistance, abrasion resistance, chemical resistance and heat resistance, and moreover, also has environmental conservation properties on the global scale.

Therefore, a first object of the present invention is to provide a technology that makes it possible to effectively use, for industrial applications, polyhydroxy polyurethane resins, the development of applications of which has not moved ahead although they are useful materials considered to contribute to the resolution of problems such as global warming and resource depletion. More specifically, it is an object to provide a polyhydroxy polyurethane resin, which is also sufficiently satisfactory in performances such as heat resistance, chemical resistance and abrasion resistance although products formed with the resin are responsive to the environment.

A second object of the present invention is to provide an imitation leather as an environment-responsive product, which can contribute to the reduction of carbon dioxide considered to be a worldwide problem as a global greenhouse gas and is excellent from the viewpoint of the conservation of the global environment, by developing, as a utilization technology for the above-described useful resin, the imitation leather with a material which is not inferior to conventional imitation leathers, is excellent in hand feeling, surface scratch resistance, abrasion resistance, chemical resistance and heat resistance, and contains carbon dioxide incorporated and fixed therein.

Means for Solving the Problem

The above-described first object can be achieved by the present invention to be described hereinafter. Specifically, the present invention provides a self-crosslinking, polysiloxane-modified, polyhydroxy polyurethane resin characterized by having masked isocyanate groups in a structure of a polysiloxane-modified, polyhydroxy polyurethane resin derived from a reaction of a 5-membered cyclic carbonate compound and an amine-modified polysiloxane compound and having polysiloxane segments therein.

As more preferred embodiments of the self-crosslinking, polysiloxane-modified, polyhydroxy polyurethane resin according to the present invention, those which meet the following requirements, respectively, can be mentioned: the 5-membered cyclic carbonate compound is a reaction product of an epoxy compound and carbon dioxide, and contains, in a structure thereof, carbon dioxide in a range of 1 to 25 mass %; a content of polysiloxane segments in a molecule of the polysiloxane-modified, polyhydroxy polyurethane resin is 1 to 75 mass %; and the masked isocyanate groups are reaction products of organic polyisocyanate groups and a masking agent, and, when subjected to heat treatment, are demasked to form isocyanate groups, which are reactable with hydroxyl groups in the structure of the self-crosslinking, polysiloxane-modified, polyhydroxy polyurethane resin to induce self-crosslinking.

The present invention also provides, as another embodiment, a process for producing any one of the above-described self-crosslinking, polysiloxane-modified, polyhydroxy polyurethane resins, characterized by using a modifier having at least one free isocyanate group and at least one masked isocyanate group, and reacting free isocyanate groups of the modifier with hydroxyl groups in the polysiloxane-modified, polyhydroxy polyurethane resin, which has been derived from the reaction of the 5-membered cyclic carbonate compound and the amine-modified polysiloxane compound and has the polysiloxane segments therein, to obtain the polysiloxane-modified, polyhydroxy polyurethane resin having masked isocyanate groups in the structure thereof.

As more preferred embodiments of the production process according to the present invention, the 5-membered cyclic carbonate compound is a reaction product of an epoxy compound and carbon dioxide, and carbon dioxide is contained in a range of from 1 to 25 mass % in the polysilxane-modified, polyhydroxy polyurethane resin derived from the reaction of the 5-membered cyclic carbonate compound and the amine-modified polysiloxane compound; and the modifier is a reaction product of an organic polyisocyanate compound and a masking agent.

The present invention also provides, as a further embodiment, a resin material characterized by comprising any one of the above-described self-crosslinking, polysiloxane-modified, polyhydroxy polyurethane resins and another binder resin blended therewith.

The above-described second object can be achieved by the present invention to be described hereinafter. Specifically, the present invention provides an imitation leather characterized by comprising a base fabric; and a resin composition impregnated in or laminated on the base fabric and composed, as a principal component, of a self-crosslinking, polysiloxane-modified, polyhydroxy polyurethane resin, said self-crosslinking, polysiloxane-modified, polyhydroxy polyurethane resin having masked isocyanate groups in a structure of a polysiloxane-modified, polyhydroxy polyurethane resin derived from a reaction of a 5-membered cyclic carbonate compound and an amine-modified polysiloxane compound and having polysiloxane segments therein.

As preferred embodiments of the imitation leather according to the present invention, those which meet the following requirements, respectively, can be mentioned: the 5-membered cyclic carbonate compound is a reaction product of an epoxy compound and carbon dioxide, and carbon dioxide is contained in a range of 1 to 25 mass % in a structure of the self-crosslinking, polysiloxane-modified, polyhydroxy polyurethane resin; a content of polysiloxane segments in a molecule of the self-crosslinking, polysiloxane-modified, polyhydroxy polyurethane resin is 1 to 75 mass %; the masked isocyanate groups are reaction products of organic polyisocyanate groups and a masking agent, and, when subjected to heat treatment, are demasked to form isocyanate groups, which are reactable with hydroxyl groups in the structure of the self-crosslinking, polysiloxane-modified, polyhydroxy polyurethane resin to induce self-crosslinking; and the resin composition further comprises another resin.

Advantageous Effects of the Invention

According to the present invention, there is first provided a self-crosslinking, polysiloxane-modified, polyhydroxy polyurethane resin that has made it possible to effectively use, for industrial applications, a polyhydroxy polyurethane resin, the development of applications of which has not moved ahead although it is a useful material considered to contribute to the resolution of problems such as global warming and resource depletion. More specifically, the present invention provides a self-crosslinking, polysiloxane-modified, polyhydroxy polyurethane resin that products formed with the resin can be also sufficiently satisfactory in performance such as lubricity, abrasion resistance, chemical resistance, non-tackiness and heat resistance although they are environment-responsive products which contain carbon dioxide incorporated therein and can contribute to the reduction of warming gas; and also a material making use of the resin.

According to the present invention, there is secondly provided an imitation leather as an environment-responsive product, which can contribute to the reduction of carbon dioxide considered to be a worldwide problem as a global greenhouse gas and is also excellent from the viewpoint of the conservation of the global environment, owing to its production by using, as a forming material therefor, a material which is not inferior to conventional imitation leathers, is excellent in hand feeling, surface scratch resistance, abrasion resistance, chemical resistance and heat resistance, and contains carbon dioxide incorporated and fixed therein.

MODES FOR CARRYING OUT THE INVENTION

The present invention will next be described in further detail based on preferred embodiments. The self-crosslinking, polysiloxane-modified, polyhydroxy polyurethane resin according to the present invention has masked isocyanate groups in a structure of a polysiloxane-modified, polyhydroxy polyurethane resin derived from a reaction of a 5-membered cyclic carbonate compound and an amine-modified polysiloxane compound and having polysiloxane segments therein. The self-crosslinking, polysiloxane-modified, polyhydroxy polyurethane resin can be readily obtained by using a modifier having at least one free isocyanate group and at least one masked isocyanate group, and reacting free isocyanate groups of the modifier with hydroxyl groups in the polysiloxane-modified, polyhydroxy polyurethane resin derived from the reaction of the 5-membered cyclic carbonate compound and the amine-modified polysiloxane compound and containing the polysiloxane segments therein. A description will hereinafter be made about the respective components for obtaining the "modifier" and "polysiloxane-modified, polyhydroxy polyurethane resin", which are useful upon production of the self-crosslinking, polysiloxane-modified, polyhydroxy polyurethane resin.

(Modifier)

A description will be made about the components for the modifier that is used upon production of the self-crosslinking, polysiloxane-modified, polyhydroxy polyurethane resin according to the present invention. As the modifier, it is possible to use a reaction product of such an organic polyisocyanate compound and such a masking agent as will be described below.

<Organic Polyisocyanate Compound>

The organic polyisocyanate compound usable in the present invention can be, for example, an organic compound, which is an aliphatic or aromatic compound and has at least two isocyanate groups therein, and has been widely used as a synthesis raw material for polyurethane resins over years. Such known organic polyisocyanate compounds are all useful in the present invention. As particularly preferred organic polyisocyanate compounds usable in the present invention, the followings can be mentioned.

Examples include 1,4-tetramethylene diisocyanate, 1,5-pentamethylene diisocyanate, 1,6-hexamethylene diisocyanate, 3-isocyanatomethyl-3,5,5-trimethylcyclohexyl isocyanate (isophorone diisocyanate), 4,4'-dicyclohexylmethane diisocyanate, tolylene diisocyanate, 4,4'-diphenylmethane diisocyanate (MDI), 1,5-nephthalene diisocyanate, tolidine diisocyanate, xylylene diisocyanate, and the like. Adducts of these organic polyisocyanate compounds and other compounds, for example, those of the following structural formulas can also be used suitably. The present invention shall, however, not be limited to their use.

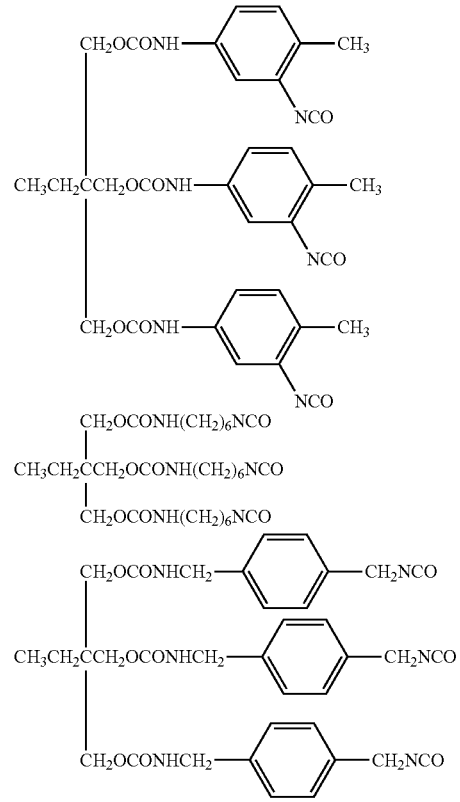

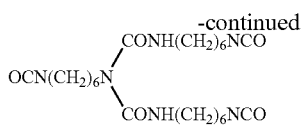

<Masking Agent>

The modifier for use in the present invention is a reaction product of the above-described organic polyisocyanate compound and a masking agent. As the masking agent, those to be described below can be used. They are alcohol-based, phenol-based, active methylene-based, acid amide-based, imidazole-based, urea-based, oxime-based and pyridine-based compounds, and the like. They can be used either singly or in combination. Specific masking agents are as will be described below.

As alcohol-based masking agents, methanol, ethanol, propanol, butanol, 2-ethylhexanol, methylcellosolve, cyclohexanol and the like can be mentioned. As phenol-based masking agents, phenol, cresol, ethylphenol, nonylphenyl and the like can be mentioned. As active methylene-based masking agents, dimethyl malonate, diethyl malonate, methyl acetoacetate, ethyl acetoacetate, acetylacetone and the like can be mentioned. As acid amide-based masking agents, acetanilide, acetic acid amide, ε-caprolactam, γ-butyrolactam and the like can be mentioned. As imidazole-based masking agents, imidazole, 2-methylimidazole and the like can be mentioned. As urea-based masking agents, urea, thiourea, ethylene urea and the like can be mentioned. As oxime-based masking agents, formamidoxime, acetoxime, methyl ethyl ketoxime, cyclohexanone oxime and the like can be mentioned. As pyridine-based masking agents, 2-hydroxypyridine, 2-hydroxyquinoline and the like can be mentioned.

<Synthesis Process of Modifier>

One of the above-described organic polyisocyanate compounds and one of the above-described masking agents are reacted to synthesize a modifier, which is useful in the present invention, contains at least one free isocyanate group and at least one masked isocyanate group. No particular limitation is imposed on its synthesis process, but a modifier can be readily obtained by reacting the masking agent and the organic polyisocyanate compound at such a functional group ratio that one or more isocyanate groups become excessive per molecule, in the presence or absence of an organic solvent and catalyst, at a temperature of 0 to 150° C., preferably 20 to 80° C., for 30 minutes to 3 hours.

(Polysiloxane-Modified, Polyhydroxy Polyurethane Resin)

The polysiloxane-modified, polyhydroxy polyurethane resin, which is to be modified to a self-crosslinking type through a reaction with such a specific modifier as described above, can be obtained by a reaction of a 5-membered cyclic carbonate compound and an amine-modified polysiloxane compound. A description will hereinafter be made about the respective components used in the reaction.

<5-Membered Cyclic Carbonate Compound>

The 5-membered cyclic carbonate compound useful in the present invention can be produced by reacting an epoxy compound and carbon dioxide as shown by the below-described "Equation-A". Described more specifically, it can be obtained by reacting the epoxy compound with carbon dioxide in the presence or absence of an organic solvent, in the presence of a catalyst, at a temperature of 40° C. to 150° C., under normal pressure or slightly elevated pressure, over 10 to 20 hours. As a result, carbon dioxide is fixed in the resulting compound.

[Epoxy Compound]

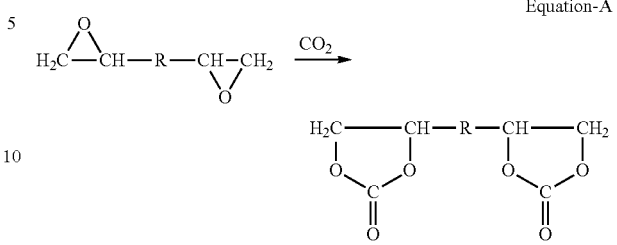

Equation-A

Examples of the epoxy compound, which are usable as described above, include such compounds as will be described next.

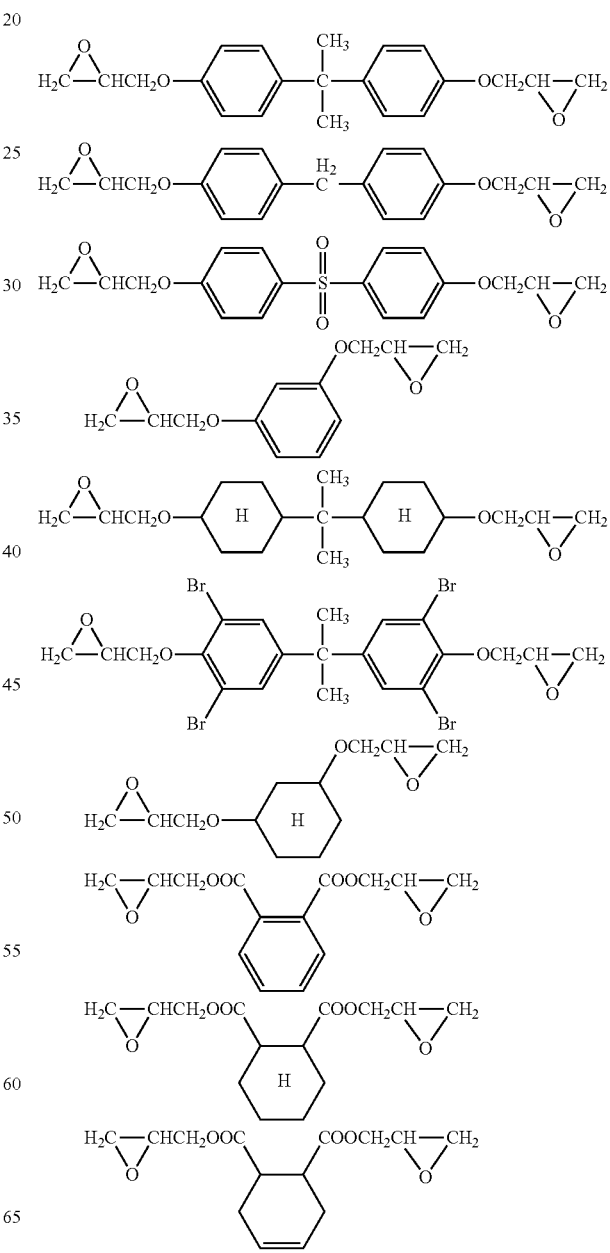

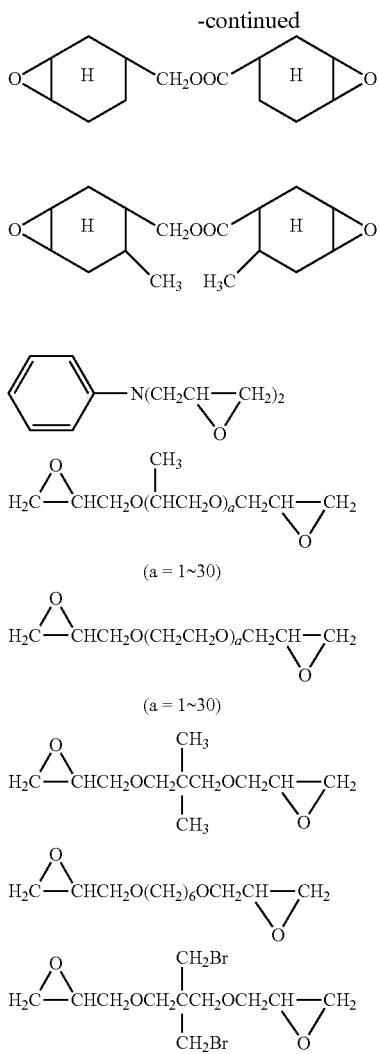

The above-enumerated epoxy compounds are those preferred for use in the present invention, and the present invention shall not be limited to the use of these exemplified compounds. Not only the above-exemplified compounds but also other compounds currently sold on the market and readily available from the market can all be used in the present invention accordingly.

[Catalyst]

As catalysts usable in such a reaction of an epoxy compound and carbon dioxide as described above, base catalysts and Lewis acid catalysts can be mentioned.

The base catalysts include tertiary amines such as triethylamine and tributylamine; cyclic amines such as diazabicycloundecene, diazabicyclooctane and pyridine; alkali metal salts such as lithium chloride, lithium bromide, lithium fluoride and sodium chloride; alkaline earth metal salts such as calcium chloride; quaternary ammonium salts such as tetrabutyl ammonium chloride, tetraethyl ammonium bromide and benzyl trimethyl ammonium chloride; carbonate salts such as potassium carbonate and sodium carbonate; metal acetate salts such as zinc acetate, lead acetate, copper acetate and iron acetate; metal oxides such as calcium oxide, magnesium oxide and zinc oxide; and phosphonium salts such as tetrabutyl phosphonium chloride.

The Lewis acid catalysts include tin compounds such as tetrabutyltin, dibutyltin dilaurate, dibutyltin diacetate and dibutyltin octoate.

The above-described catalyst may be used in a proportion of 0.1 to 100 parts by mass or so, preferably 0.3 to 20 parts by mass per 50 parts by mass of the epoxy compound. If the above-described catalyst is used in a proportion of smaller than 0.1 parts by mass, the catalyst will be unable to fully exhibit its effects as a catalyst. If the above-described catalyst is used in a proportion of greater than 100 parts by mass, on the other hand, the resin to be obtained finally may be lowered in various performance. Therefore, such an excessively small or large proportion is not preferred. In such a case that the residual catalyst would induce a serious reduction in performance, however, it may be configured to wash the reaction mixture with purified water such that the residual catalyst can be removed.

Organic solvents usable in the reaction of the epoxy compound and carbon dioxide include dimethylformamide, dimethyl sulfoxide, dimethylacetamide, N-methylpyrrolidone, N-ethylpyrrolidone, tetrahydrofuran, and the like. These organic solvents may also be used as mixed systems with other poor solvents, for example, methyl ethyl ketone, xylene, toluene, tetrahydrofuran, diethylether, cyclohexanone, and the like.

<Synthesis Process of Resin>

The polysiloxane-modified, polyhydroxy polyurethane resin for use in the present invention can be obtained, for example, by reacting the 5-membered cyclic carbonate compound, which has been obtained as described above, with an amine-modified polysiloxane compound in the presence of an organic solvent at a temperature of 20° C. to 150° C. as shown by the below-described "Equation-B". As a result, the resin so obtained contains 1 to 25 mass % or so of carbon dioxide.

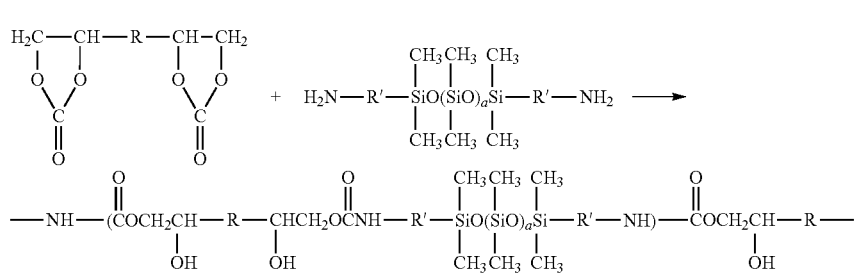

Equation-B

<Amine-Modified Polysiloxane Compound>

Examples of the amine-modified polysiloxane compound for use in the above-described reaction may include such compounds as will be described next. They can be used either singly or as a combination of two or more thereof. It is to be noted that the below-described term "lower alkylene group" means one having 1 to 6, more preferably 1 to 4 carbon atoms.

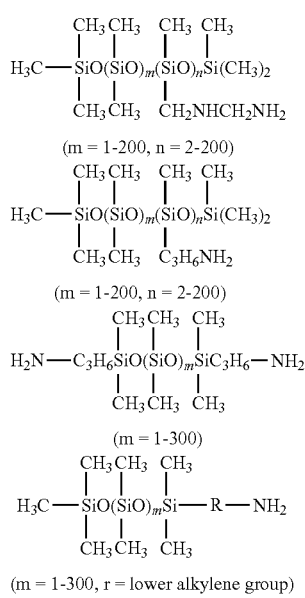

(m = 1-300, r = lower alkylene group)

The above-enumerated amine-modified polysiloxane compounds are those preferred for use in the present invention, and the present invention shall not be limited to the use of these exemplified compounds. Not only the above-exemplified compounds but also other compounds currently sold on the market and readily available from the market can all be used in the present invention accordingly.

<Physical Properties>

The polysiloxane-modified polyhydroxy polyurethane resin having polysiloxane segments, which can be obtained as described above, may preferably be controlled such that the content of polysiloxane segments in a molecule of the resin ranges from 1 to 75 mass %. Described specifically, a content of lower than 1 mass % results in insufficient development of the function associated with surface energy owing to polysiloxane segments, while a content of higher than 75 mass % provides the polyhydroxy polyurethane resin with insufficient performance in mechanical strength, abrasion resistance and the like. Such an excessively low or high content is, therefore, not preferred. The content of polysiloxane segments may be more preferably 2 to 70 mass %, still more preferably 5 to 60 mass %.

Further, the polysiloxane-modified, polyhydroxy polyurethane resin for use in the present invention may preferably have a number average molecular weight (a polystyrene-equivalent value as measured by GPC) in a range of 2,000 to 100,000. A more preferred range of the number average molecular weight may be 5,000 to 70,000 or so.

The hydroxyl value of the polysiloxane-modified, polyhydroxy polyurethane resin for use in the present invention may preferably be 20 to 300 mgKOH/g. If the hydroxyl value is smaller than the above-described range, the carbon dioxide reduction effect is insufficient. If the hydroxyl value exceeds the above-described range, various physical properties as a high molecular compound become insufficient. Hydroxyl values outside the above-described range are not preferred accordingly.

The self-crosslinking, polysiloxane-modified, polyhydroxy polyurethane resin according to the present invention can be readily obtained by using the above-described "modifier" and "polysiloxane-modified, polyhydroxy polyurethane resin". In this respect, a description will hereinafter be made.

(Production Process of Self-Crosslinking, Polysiloxane-Modified, Polyhydroxy Polyurethane Resin)

The self-crosslinking, polysiloxane-modified, polyhydroxy polyurethane resin according to the present invention can be obtained by reacting a modifier and a polysiloxane-modified polyhydroxy polyurethane resin, both of which have been obtained as mentioned above. Specifically, it can be obtained through a reaction between hydroxyl groups in the polysiloxane-modified, polyhydroxy polyurethane resin and free isocyanate groups in the modifier.

The modification rate of the self-crosslinking, polysiloxane-modified, polyhydroxy polyurethane resin according to the present invention with the modifier may preferably be 2 to 60%. A modification rate of lower than 2% is not preferred, because it induces no sufficient crosslinking so that the resulting product may be insufficient in heat resistance, chemical resistance and the like. A modification rate of higher than 60%, on the other hand, is not preferred either, because the possibility that demasked isocyanate groups would remain without any reaction may increase. It is to be noted that the above-described modification rate is calculated as follows.

Modification rate (%)={1−(hydroxyl groups in a resin after modification÷hydroxyl groups in the resin before modification)}×100

The reaction of the modifier and polysiloxane-modified polyhydroxy polyurethane resin may be preferably carried out by reacting them in the presence or absence of an organic solvent and catalyst, at a temperature of 0 to 150° C., preferably 20 to 80° C. for 30 minutes to 3 hours. By such a method as described above, the self-crosslinking, polysiloxane-modified, polyhydroxy polyurethane resin can be readily obtained. However, it is necessary to pay attention to carrying out the reaction at a temperature of lower than the removal temperature of the masking agent during the reaction such that by the reaction, masked isocyanate groups are incorporated in the structure of the polysiloxane-modified polyhydroxy polyurethane resin.

(Use of Self-Crosslinking, Polysiloxane-Modified, Polyhydroxy Polyurethane Resin)

The self-crosslinking, polysiloxane-modified, polyhydroxy polyurethane resin of the present invention, which can be obtained as described above, can be used, as it is, as film and molding materials, various coating materials, diverse paints, miscellaneous binders and the like, so that products excellent in lubricity, abrasion resistance, chemical resistance, non-tackiness, heat resistance and the like can be obtained. For various applications and upon formation of films, the self-crosslinking, polysiloxane-modified, polyhydroxy polyurethane resin can be used by blending therein desired ones of conventionally-known diverse resins as binder resins or the like for the purpose of adjustments or the like of resin properties. Preferred as binder resins usable as described above are those which can chemically react with isocyanate groups formed as a result of the removal of masked moieties in the structure of the self-crosslinking, polysiloxane-modified, polyhydroxy polyurethane resin. However, even resins which do not have such reactivity as described above can still be used as needed according to purposes in combination with the self-crosslinking, polysiloxane-modified, polyhydroxy polyurethane resin according to the present invention.

As binder resins usable in combination with the self-crosslinking, polysiloxane-modified, polyhydroxy polyurethane resin according to the present invention, various resins which have been conventionally employed as binder resins can be used, and no particular limitation is imposed. Usable examples include acrylic resins, polyurethane resins, polyester resins, polybutadiene resins, silicone resins, melamine resins, phenol resins, polyvinyl chloride resins, cellulose resins, alkyd resins, modified cellulose resins, fluorinated resins, polyvinyl butyral resins, epoxy resins, polyamide resins, and the like. It is also possible to use resins obtained by modifying these various resins with silicone or fluorine. When such a binder resin is used in combination, it may be added in a proportion of preferably 5 to 90 parts by mass, more preferably not greater than 60 parts by mass per 100 parts by mass of the self-crosslinking, polysiloxane-modified, polyhydroxy polyurethane resin according to the present invention although the proportion differs depending on the product to be formed or its application purpose. Needless to say, as the self-crosslinking, polysiloxane-modified, polyhydroxy polyurethane resin according to the present invention is used in a greater proportion, the resulting environment-responsive product becomes more preferred.

When subjected to heat treatment, the self-crosslinking, polysiloxane-modified, polyhydroxy polyurethane resin according to the present invention is demasked to form isocyanate groups. The thus-formed isocyanate groups react with hydroxyl groups in the self-crosslinking, polysiloxane-modified, polyhydroxy polyurethane resin, thereby undergoing self-crosslinking to form a crosslinked resin. When formed into products or the like, excellent heat resistance, abrasion resistance and chemical resistance can be obtained accordingly. As the polysiloxane segments orient to a surface, the resin is excellent especially in heat resistance, lubricity, non-tackiness and the like, which the polysiloxane segments are equipped with. The polysiloxane-modified, polyhydroxy polyurethane resin to be used upon synthesis of the self-crosslinking, polysiloxane-modified, polyhydroxy polyurethane resin according to the present invention is synthesized using a 5-membered cyclic carbonate compound. As this 5-membered cyclic carbonate compound can be obtained by reacting an epoxy compound and carbon dioxide as described above, carbon dioxide can be incorporated and fixed in the resin. This means that the present invention makes it possible to provide a material responsive to environmental conservation, which is also useful from the viewpoint of the reduction of warming gas and has not been realized with conventional products.

As has been described above, the self-crosslinking, polysiloxane-modified, polyhydroxy polyurethane resin according to the present invention is very useful as various molding materials, materials for synthetic leathers and artificial leathers, fiber coating materials, surface treatment materials, thermal recording media, strippable materials, paints, binders for printing inks, and the like. A description will hereinafter be made about one of its application examples, that is, an imitation leather (synthetic leather or artificial leather material).

[Imitation Leather]
(Resin Composition for Imitation Leather)

The imitation leather according to the present invention is characterized in that a resin composition (hereinafter called "the resin composition for imitation leather"), which contains as a principal component the above-mentioned self-crosslinking, polysiloxane-modified, polyhydroxy polyurethane resin of the present invention, is used as a resin composition to be filled in or laminated on a base fabric. As described above, the resin is a self-crosslinking, polysiloxane-modified, polyhydroxy polyurethane resin having the specific structure derived from the reaction of a 5-membered cyclic carbonate compound and an amine-modified polysiloxane compound and having masked isocyanate groups therein. The masked isocyanate groups in the structure are reaction products of organic polyisocyanate groups and a masking agent and, when subjected to heat treatment, are demasked to form isocyanate groups, which are reactable with hydroxyl groups in the structure of the self-crosslink, polysiloxane-modified, polyhydroxy polyurethane resin to induce self-crosslinking. Therefore, the use of the resin as a material for forming an imitation leather makes it possible to obtain an imitation leather excellent in hand feeling, surface scratch resistance, abrasion resistance, chemical resistance and heat resistance. As a resin for use in the above-described application, particularly preferred from the viewpoint of the conservation of the global environment is such a self-crosslinking, polysiloxane-modified, polyhydroxy polyurethane resin that the 5-membered cyclic carbonate compound is the reaction product of the epoxy compound and carbon dioxide and carbon dioxide is contained in a range of 1 to 25 mass % in the structure of the resin.

As mentioned above, the self-crosslinking, polysiloxane-modified, polyhydroxy polyurethane resin according to the present invention is obtained by reacting the modifier and the polysiloxane-modified polyhydroxy polyurethane resin. When the resin is used as an imitation leather, the modification rate of the polysiloxane-modified polyhydroxy polyurethane resin with the modifier may preferably range from 2 to 60%. Its performance such as the heat resistance and chemical resistance after heat treatment can be controlled to some extent by the modification rate. However, a modification rate of lower than 2% is not preferred, because no sufficient crosslinking occurs and, when employed for the production of an imitation leather, the product may be insufficient in heat resistance, chemical resistance and the like. A modification rate of higher than 60%, on the other hand, is not preferred either, because there is a higher possibility that demasked isocyanate groups may remain without any reaction. It is to be noted that the calculation method of the modification rate has been described above.

The resin composition for imitation leather is used preferably in the form of an organic solvent solution or a water dispersion upon production of an imitation leather. When the resin composition is used in the form of an organic solvent solution, it is preferred to use an organic solvent to be described below. Examples include dimethylformamide, dimethyl sulfoxide, dimethyl acetamide, N-methylpyrrolidone, N-ethylpyrrolidone, and the like. The concentration of the resin in the organic solvent solution 100 mass % may preferably be 10 to 60 mass %. A resin concentration of lower than 10 mass % is not preferred, because it may lead to inferior film-forming properties in wet-process film formation, the resulting film may be insufficient in thickness, and hence, the resulting imitation leather may be provided with insufficient strength. A resin concentration of higher than 60 mass %, on the other hand, is not preferred either because such an excessively high resin concentration may lead to incomplete formation of a porous layer in wet-process film formation, and moreover, may raise such a problem that the organic solvent would remain in the resulting film. From the viewpoint of measures against VOC, such excessive use of an organic solvent is, therefore, not preferred either.

When the resin composition for imitation leather is used in the form of a water dispersion in the present invention, it is preferred to adopt such a contrivance as will be described hereinafter. First, the hydroxyl groups or NH groups in the self-crosslinking, polysiloxane-modified, polyhydroxy polyurethane resin are half-esterified or half-amidated with an acid anhydride to introduce carboxyl groups into the resin. Subsequently, the carboxyl groups are preferably neutralized with ammonia, an organic amine compound, an inorganic base or the like to form carboxylate salt groups such that the resin can be used as a self-emulsified water dispersion. As the acid anhydride used here, illustrative are phthalic anhydride, trimellitic anhydride, hexahydrophthalic anhydride, and the like. On the other hand, examples of the organic amine compound include monoethanolamine, diethanolamine, triethanolamine, diethylethanolamine, aminoethylethanolamine, and the like. Further, the resin composition for imitation leather may be a water dispersion emulsified with a surfactant in water by a method known per se in the art.

(Other Components)

The resin composition for imitation leather, said resin composition being useful in the present invention, may also be used by blending therein one or more of conventionally-known various other resins to adjust the workability such as impregnation, coating or covering applicability to the base fabric and the hand feeling and various performance of the imitation leather to be obtained. Preferred as other resins to be used or blended are those chemically reactable with isocyanate groups to be formed as a result of demasking of the masking agent in the self-crosslinking, polysiloxane-modified, polyhydroxy polyurethane resin. However, even resins having no reactivity can be also used in the present invention.

As resins usable when the resin composition for imitation leather, which is useful in the present invention, is in the form of a combination of the self-crosslinking, polysiloxane-modified, polyhydroxy polyurethane resin with one or more of the other resins different from the self-crosslinking, polysiloxane-modified, polyhydroxy polyurethane resin, polyurethane-based resins which have been conventionally used in imitation leathers are preferred although no particular limitation is imposed. For example, acrylic resins, polyester resins, polybutadiene resins, silicone resins, melamine resins, phenol resins, phenoxy resins, vinyl chloride resin, vinyl chloride-vinyl acetate resin, cellulose resins, alkyd resins, modified cellulose resins, fluorinated resins, polyvinyl butyral resins, epoxy resins, polyamide resins, and the like can be used. When one or more of these resins are used in combination, such a resin or resins may be used in a proportion of 5 to 90 mass % based on the self-crosslinking, polysiloxane-modified, polyhydroxy polyurethane resin which is essential in the present invention. As the self-crosslinking, polysiloxane-modified, polyhydroxy polyurethane resin according to the present invention is used in a greater proportion, the resulting leather is provided as a more preferred, environment-responsive product.

To the resin composition for imitation leather, said resin composition being useful in the present invention, one or more of various additives such as antioxidants, ultraviolet absorbers, anti-hydrolysis agents, pigments, dyes, flame retardants and fillers may be added in addition to one or more of the above-described various resins as needed.

(Production Process of Imitation Leather)

The imitation leather according to the present invention is characterized in that as a resin composition to be impregnated in or laminated on the base fabric, one containing as a principal component the above-described self-crosslinking, polysiloxane-modified, polyhydroxy polyurethane resin with the masked isocyanate groups contained in the structure thereof has been used. No particular limitation is, therefore, imposed on the production process of the imitation leather, and the known production processes of artificial leathers or synthetic leathers can be all used. In the imitation leather according to the present invention, there is also included one produced by arranging a plasticizer-containing, vinyl chloride resin layer on a base fabric, providing it as a base material sheet, and forming on the base material sheet a layer composed from a resin composition for imitation leather, said resin composition containing as a principal component thereof the self-crosslinking, polysiloxane-modified, polyhydroxy polyurethane resin which characterizes the present invention.

As the base fabric that makes up the imitation leather according to the present invention, the base fabrics which have been conventionally used in the production of imitation leathers and include the above-described base material sheet are all usable, and no particular limitation is imposed.

As a result of the use of the above-described specific polyurethane resin as a resin, the invention imitation leather of the above-described construction is excellent in hand feeling, surface scratch resistance, abrasion resistance, chemical resistance and heat resistance. Further, the self-crosslinking, polysiloxane-modified, polyhydroxy polyurethane resin, which characterizes the present invention, is synthesized using a 5-membered cyclic carbonate compound. As mentioned above, the 5-membered cyclic carbonate compound can be obtained by reacting an epoxy compound and carbon dioxide so that carbon dioxide can be incorporated and fixed in the resin. This means that the present invention makes it possible to provide an imitation leather as a product responsive to environmental conservation, which is useful from the viewpoint of the reduction of warming gas and has not been realized with conventional products.

EXAMPLES

The present invention will next be described in further detail based on specific production examples, examples and comparative examples, although the present invention shall not be limited to these examples. It is to be noted that the terms "parts" and "%" in the following examples are on a mass basis unless otherwise specifically indicated.

Production Example 1

Production of Modifier

While thoroughly stirring a 1:3 adduct of trimethylolpropane and hexamethylene diisocyanate ("COLONATE HL", trade name, product of Nippon Polyurethane Industry Co., Ltd.; NCO: 12.9%, solids content: 75%) (100 parts) and ethyl acetate (24.5 parts) at 100° C., ε-caprolactam (25.5 parts) was added, followed by a reaction for 5 hours. According to an infrared absorption spectrum (as measured by "FT-720" manufactured by HORIBA Ltd.; this will apply equally hereinafter) of the resulting modifier, an absorption of free isocyanate groups remained at 2,270 cm$^{-1}$. Upon quantification of those free isocyanate groups, the actual measurement value was 1.8% at a solids content of 50% (cf. calculated value: 2.1%). The primary structure of the above-described modifier is, therefore, presumed to be represented by the below-described formula.

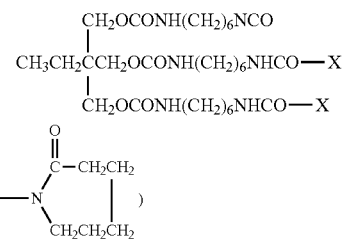

Production Example 2

Production of Modifier

While thoroughly stirring an adduct of hexamethylene diisocyanate and water ("DURANATE 24A-100", trade name, product of Asahi Kasei Corporation; NCO: 23.0%) (100 parts) and ethyl acetate at 80° C., methyl ethyl ketoxime (32 parts) was added, followed by a reaction for 5 hours. According to an infrared absorption spectrum of the resulting modifier, an absorption of free isocyanate groups remained at 2,270 cm$^{-1}$. Upon quantification of those free isocyanate groups, the actual measurement value was 2.6% at a solids content of 50% (cf. calculated value: 2.9%). The primary structure of the above-described modifier is, therefore, presumed to be represented by the below-described formula.

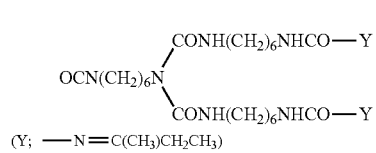

(Y; —N=C(CH$_3$)CH$_2$CH$_3$)

Production Example 3

Production of 5-Membered Cyclic Carbonate Compound

To a reaction vessel equipped with a stirrer, thermometer, gas inlet tube and reflux condenser, a divalent epoxy compound represented by formula (A) ("EPICOAT 828", trade name, product of Japan Epoxy Resin Co., Ltd.; epoxy equivalent: 187 g/mol) (100 parts), N-methylpyrrolidone (100 parts) and sodium iodide (1.5 parts) were added, followed by dissolution into a homogeneous solution.

Formula (A)

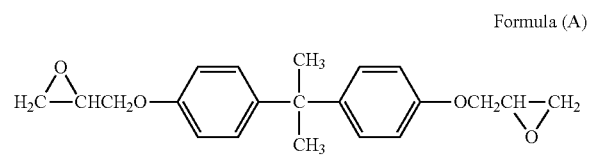

Subsequently, the solution was stirred under heating at 80° C. for 30 hours while bubbling carbon dioxide gas at a rate of 0.5 L/min. After completion of a reaction, the resultant reaction mixture was gradually added into n-hexane (300 parts) while stirring the latter at a high speed of 300 rpm. The resulting powdery reaction product was collected by a filter, and then washed with methanol to eliminate N-methylpyrrolidone and sodium iodide. The powder so obtained was dried in a drier to obtain, as a white powder, a 5-membered cyclic carbonate compound (1-A) (118 parts, yield: 95%).

In an infrared absorption spectrum of the reaction product (1-A) obtained as described above, a peak around 910 cm$^{-1}$, which is attributable to the epoxy groups in the raw material, practically disappeared with respect to the reaction product, but an absorption of carbonyl groups in a cyclic carbonate group, which did not exist in any raw material, was confirmed around 1,800 cm$^{-1}$. The number average molecular weight of the reaction product was 414 (polystyrene equivalent; measured by "GPC-8220" manufactured by Tosoh Corporation). In the thus-obtained 5-membered cyclic carbonate compound (1-A), carbon dioxide was fixed as much as 19%.

Production Example 4

Production of 5-Membered Cyclic Carbonate Compound

Using a divalent epoxy compound represented by formula (B) ("YDF-170", trade name, product of Tohto Kasei Co., Ltd.; epoxy equivalent: 172 g/mol) in place of the divalent epoxy compound (A) used in Production Example 3, a reaction was conducted as in Production Example 3 to obtain, as a white powder, a 5-membered cyclic carbonate compound (1-B) (121 parts, yield: 96%).

Formula (B)

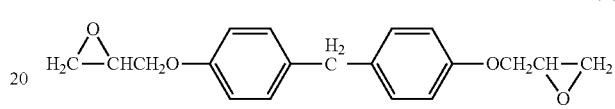

The reaction product obtained as described above was identified by infrared absorption spectroscopy, GPC and NMR as in Production Example 3. In the thus-obtained 5-membered cyclic carbonate compound (1-B), carbon dioxide was fixed as much as 20.3%.

Example 1

Production of Self-Crosslinking, Polysiloxane-Modified, Polyhydroxy Polyurethane Resin A reaction vessel equipped with a stirrer, thermometer, gas inlet tube and reflux condenser was purged with nitrogen. To the reaction vessel, the 5-membered cyclic carbonate compound (100 parts) obtained in Production Example 3 was added, and further, N-methylpyrrolidone was added to adjust the solids content to 35%, followed by dissolution into a homogeneous solution. An amine-modified polysiloxane compound of the structure represented by formula (C) (201 parts) was then added to obtain a predetermined equivalent amount relative to the 5-membered cyclic carbonate compound. The resulting mixture was stirred at a temperature of 90° C. for 10 hours so that a reaction was conducted until the amine-modified polysiloxane compound became no longer detectable, whereby a polysiloxane-modified, polyhydroxy polyurethane resin was synthesized. The modifier (solids content: 50%) of Production Example 1 was next added in an amount that the solids content ratio of the modifier to the resin synthesized as described above became 100:10, followed by a reaction at 90° C. for 3 hours. Upon confirmation of disappearance of an absorption of isocyanate groups in an infrared absorption spectrum, a solution of the self-crosslinking, polysiloxane-modified, polyhydroxy polyurethane resin of this example was obtained.

Formula (C)

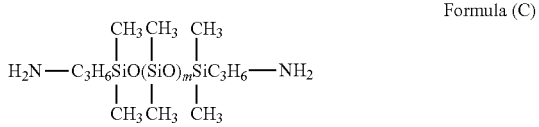

($m$ is a value to give a molecular weight to 860)

Examples 2 to 4

Production of Self-Crosslinking, Polysiloxane-Modified, Polyhydroxy Polyurethane Resins The 5-membered cyclic carbonate compounds, the amine-modified polysiloxane compounds and the modifiers obtained in Production Example 1 and 2 were then combined and reacted, respectively, in a similar manner as in Example 1 to obtain solutions of the self-crosslinking, polysiloxane-modified, polyhydroxy polyurethane resins of Examples 2 to 4 described in Table 1.

Comparative Example 1

Production of Polyhydroxy Polyurethane Resin

A solution of a polysiloxane-modified, polyhydroxy polyurethane resin was obtained in a similar manner as in Example 1 except that the reaction with the modifier obtained in Production Example 1 in the final step was not carried out. Specifically, the solution of the polysiloxane-modified, polyhydroxy polyurethane resin was produced as will be described below. A reaction vessel equipped with a stirrer, thermometer, gas inlet tube and reflux condenser was purged with nitrogen. In the reaction vessel, N-methylpyrrolidone was added to the 5-membered cyclic carbonate compound (100 parts) obtained in Production Example 4 to give a solids content of 35%, followed by dissolution into a homogeneous solution. The amine-modified polysiloxane compound was next added in a predetermined equivalent amount, and the resulting mixture was stirred at a temperature of 90° C. for 10 hours so that a reaction was conducted until the amine-modified polysiloxane compound became no longer detectable. Properties of the thus-obtained polysiloxane-modified, polyhydroxy polyurethane resin were as described in Table 1.

TABLE 1

Compositions of Respective Polyhydroxy Polyurethane Resins, and Properties of the Resins

|  | Example 1 | Example 2 | Example 3 | Example 4 | Comp. Ex. 1 |
| --- | --- | --- | --- | --- | --- |
| Carbonate compound (i) | 1-A | 1-A | 1-B | 1-B | 1-B |
| Amine-modified Si compound (ii) | Si[1] | Si[1] | Si[1] | Si[1] | Si[1] |
| Molar ratio (i/ii) | 1.0 | 1.0 | 1.0 | 1.0 | 1.0 |
| Modifier | Production Example 1 | Production Example 1 | Production Example 2 | Production Example 2 | — |
| (Resin/modifier) solids content ratio | 100/10 | 100/15 | 100/10 | 100/15 | — |
| Solution viscosity (35% conc., MPa·s) | 2.0 | 3.2 | 2.6 | 3.7 | 2.3 |
| Number average molecular weight | 34,000 | 45,000 | 41,000 | 58,000 | 37,000 |
| Hydroxyl value (mgKOH/g) | 73 | 69 | 76 | 72 | 87 |
| Polysiloxane content (%) | 52 | 50 | 53 | 51 | 57 |
| Fixed amount of carbon dioxide (%)[2] | 5.7 | 5.4 | 5.8 | 5.6 | 6.8 |

[1] The following formula (C)

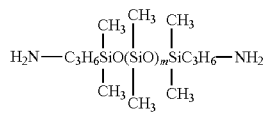

(m is a value to give a molecular weight of 860)

[2] Calculated value

Comparative Example 2

Production of Polyester Polyurethane Resin

The polyester polyurethane resin of this comparative example was synthesized as will be described below. A reaction vessel equipped with a stirrer, thermometer, gas inlet tube and reflux condenser was purged with nitrogen. In the reaction vessel, polybutylene adipate (average molecular weight: approx. 2,000)(150 parts) and 1,4-butanediol (15 parts) were dissolved in a mixed organic solvent consisting of methyl ethyl ketone (200 parts) and dimethylformamide (50 parts). Subsequently, under thorough stirring at 60° C., a solution of 4,4'-methylene bis(cyclohexyl isocyanate) (hereinafter abbreviated as "hydrogenated MDI)(62 parts) in dimethylformamide (171 parts) was gradually added dropwise, and after completion of the dropwise addition, a reaction was conducted at 80° C. for 6 hours. The reaction mixture had a viscosity of 3.2 MPa·s (25° C.) at a solids content of 35%. A film obtained from the reaction mixture had a breaking strength of 45 MPa, a breaking extension of 480%, and a thermal softening temperature of 110° C.

Comparative Example 3-1

Production of Polysiloxane-Modified Polyurethane Resin

The polysiloxane-modified polyurethane resin of this comparative example was synthesized as will be described below. Polydimethyl siloxane diol represented by formula (D) (average molecular weight: approx. 3,200) (150 parts) and 1,4-butanediol (10 parts) were dissolved in a mixed organic solvent consisting of methyl ethyl ketone (200 parts) and dimethylformamide (50 parts). Further, a solution of hydrogenated MDI (40 parts) in dimethylformamide (120 parts) was gradually added dropwise, and after completion of the dropwise addition, a reaction was conducted at 80° C. for 6 hours. The reaction mixture had a viscosity of 1.6 MPa·s (25° C.) at a solids content of 35%. A film obtained from the reaction mixture had a breaking strength of 21 MPa, a breaking extension of 250%, and a thermal softening temperature of 135° C.

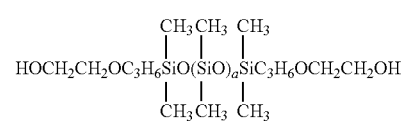

Formula (D)

($a$ is a value to give a molecular weight to 3,200)

Comparative Example 3-2

Production of Polysiloxane-Modified Polyurethane Resin

The polysiloxane-modified polyurethane resin of this comparative example, which was to be used in the formation of the below-described imitation leather, was synthesized as in Comparative Example 3-1 except that the mixed organic solvent was changed. To polydimethyl siloxane diol represented by formula (D) (average molecular weight: approx. 3,200) (150 parts) and 1,4-butanediol (10 parts), dimethylformamide solvent (250 parts) was added. To the resultant mixture, a solution of hydrogenated MDI (40 parts) in dimethylformamide (120 parts) was gradually added dropwise, and after completion of the dropwise addition, a reaction was conducted at 80° C. for 6 hours. The reaction mixture had a viscosity of 1.6 MPa·s (25° C.) at a solids content of 35%. A film obtained from the reaction mixture had a breaking strength of 21 MPa, a breaking extension of 250%, and a thermal softening temperature of 135° C.

<Ranking of Resin-Made Films>

From the respective resin solutions of Examples 1 to 4, Comparative Example 1, Comparative Example 2 and Comparative Example 3-1, films were produced by the casting method. With respect to each film so obtained, the below-described properties were measured and ranked. As casting conditions, after having been dried at 100° C. for 3 minutes, heat treatment was conducted at 160° C. for 30 minutes.

[Mechanical Properties (Tensile Strength, Extension)]

With respect to each film, its mechanical properties (tensile strength, extension) were ranked following JIS K7311. The results are shown in Table 2.

[Thermal Softening Temperature]

With respect to each film, its thermal softening temperature was ranked following JIS K7206 (Vicat softening temperature measuring method). The results are shown in Table 2.

[Abrasion Resistance]

With respect to each film, its abrasion resistance was ranked following JIS K7311. The results are shown in Table 2.

[Friction Coefficient]

With respect to each film, the friction coefficient of a surface of the film was measured by a surface property tester (manufactured by Shinto Scientific Co., Ltd.), and was ranked. The results are shown in Table 2.

[Solvent Resistance]

Following JIS K5600-6-1, each film was observed for any change in external appearance after immersion for 10 minutes in toluene controlled at 50° C., whereby its solvent resistance was ranked. The results are shown in Table 2.

[Environmental Responsiveness]

The environmental responsiveness of each film was ranked "A" (good) or "B" (poor) depending on whether or not carbon dioxide was fixed in it. The results are shown in Table 2.

TABLE 2

| | Ranking Results | | | | | | |
| --- | --- | --- | --- | --- | --- | --- | --- |
| | Ex. 1 | Ex. 2 | Ex. 3 | Ex. 4 | Comp. Ex. 1 | Comp. Ex. 2 | Comp. Ex. 3-1 |
| Tensile strength (MPa) | 38 | 43 | 31 | 41 | 17 | 45 | 21 |
| Extension (%) | 12 | 10 | 12 | 10 | 15 | 480 | 250 |
| Thermal softening temperature | 208 | 210 | 208 | 210 | 115 | 110 | 135 |
| Abrasion resistance (mg) | 11 | 8 | 10 | 7 | 25 | 55 | 36 |
| Friction coefficient | 0.101 | 0.092 | 0.097 | 0.095 | 0.123 | 0.612 | 0.133 |
| Solvent resistance | No change | No change | No change | No change | Swollen | Swollen | Swollen |

TABLE 2-continued

| | Ex. 1 | Ex. 2 | Ex. 3 | Ex. 4 | Comp. Ex. 1 | Comp. Ex. 2 | Comp. Ex. 3-1 |
|---|---|---|---|---|---|---|---|
| Environmental responsiveness | A | A | A | A | A | B | B |

Examples 5 to 13 & Comparative Examples 4 to 9

Production of Imitation Leathers

Separately using the resin solutions of Examples 1 to 4, Comparative Example 1, Comparative Example 2 and Comparative Example 3-2, coating formulations for imitation leathers were prepared according to the corresponding compositions described in Tables 3 and 4. Separately using the thus-obtained coating formulations, artificial leathers and synthetic leathers were produced as will be described below, and on the respective leathers so obtained, ranking was performed by the below-described methods.

(Artificial Leathers)

The coating formulations for imitation leathers, which contained the resins of the polymerization examples and comparative polymerization examples, respectively, were used separately. The coating formulations were applied onto nonwoven fabrics made of polystyrene-polyester fibers to give a thickness of 1 mm, respectively. The thus-coated nonwoven fabrics were immersed in a 10% aqueous solution of DMF controlled at 25° C., so that the resins were solidified. After washing, drying was conducted under heat (150° C./10 minutes) to obtain artificial leathers having porous layers as sheets.

(Synthetic Leathers)

A base fabric sheet for imitation leathers was prepared by coating and drying a solution of a polyurethane-based resin ("LETHAMINE UD-602S", trade name, product of Dainichiseika Color & Chemicals Mfg., Co., Ltd.) as an adhesive layer on a woven fabric to give a dry coat thickness of 10 μm. On the other hand, the coating formulations for leathers, which contained the resin solutions obtained in Polymerization Examples 1 to 4 and Comparative Polymerization Examples 1 to 3, respectively, were separately applied onto sheets of release paper and dried under heat (150° C./10 minutes) to form films of approx. 15 μm thickness, respectively. The thus-obtained films were bonded to cut pieces of the above-described base fabric sheet for imitation leathers to obtain synthetic leathers, respectively.

[Evaluation]

Using the respective imitation leathers obtained as artificial leathers and synthetic leathers as described above, ranking was performed by the below-described methods and standards. The results are collectively shown in Tables 3 and 4.

(Hand Feeling)

The hand feeling of each imitation leather was determined based on a hand touch feeling, and was ranked in accordance with the following standards.
A: Soft
B: A little hard
C: Hard (Friction Coefficient)

The friction coefficient of a surface of each artificial leather obtained as described above was measured by a surface property tester (manufactured by Shinto Scientific Co., Ltd.), and was ranked based on the measurement value.

(Chemical Resistance)

Onto the surface of each synthetic leather obtained as described above, toluene was dropped. For allowing the surface to always remain in a wet state, the solvent was additionally dropped. One hour later, the solvent was wiped off. The toluene-dropped, wiped-off part was visually observed, and the chemical resistance of the synthetic leather was ranked in accordance with the following standards.
A: No trace of dropping was observed at all on the coated surface.
B: A slight trace of dropping was recognized, but it was not noticeable.
C: A trace of dropping was clearly recognized.

(Surface Abrasion Resistance)

Using a plane abrasion tester, each synthetic leather obtained as described above was rubbed by reciprocating No. 6 canvas under a load of 1 kgf. The number of reciprocations until occurrence of a scratch was counted.
A: 5,000 reciprocations or more
B: 2,000 reciprocations or more, but less than 5,000 reciprocations
C: Less than 2,000 reciprocations (Thermal Softening Temperature)

With respect to each synthetic leather obtained as described above, its thermal softening temperature was measured following JIS K7206 (Vicat softening temperature measuring method).

(Environmental Responsiveness)

The environmental responsiveness of each imitation leather was ranked "A" (good) or "B" (poor) depending on whether or not carbon dioxide was fixed in the used resin.

TABLE 3

Ranking Results (Artificial Leathers)

| | Examples | | | | Comparative Examples | | |
|---|---|---|---|---|---|---|---|
| | 5 | 6 | 7 | 8 | 4 | 5 | 6 |
| Resin solution of Example 1 | 100 | | | | | | |
| Resin solution of Example 2 | | 100 | | | | | |
| Resin solution of Example 3 | | | 100 | | | | |
| Resin solution of Example 4 | | | | 100 | | | |
| Resin solution of Comp. Ex. 1 | | | | | 100 | | |

TABLE 3-continued

Ranking Results (Artificial Leathers)

| | Examples | | | | Comparative Examples | | |
|---|---|---|---|---|---|---|---|
| | 5 | 6 | 7 | 8 | 4 | 5 | 6 |
| Resin solution of Comp. Ex. 2 | | | | | | 100 | |
| Resin solution of Comp. Ex. 3-2 | | | | | | | 100 |
| Hand feeling | A | A | A | A | A | A | A |
| Friction coefficient | 0.160 | 0.152 | 0.153 | 0.147 | 0.178 | 0.507 | 0.155 |
| Environmental responsiveness | A | A | A | A | A | B | B |

TABLE 4

Ranking Results (Synthetic Leathers)

| | Examples | | | | Comparative Examples | | |
|---|---|---|---|---|---|---|---|
| | 9 | 10 | 11 | 12 | 7 | 8 | 9 |
| Resin solution of Example 1 | 100 | | | | | | |
| Resin solution of Example 2 | | 100 | | | | | |
| Resin solution of Example 3 | | | 100 | | | | |
| Resin solution of Example 4 | | | | 100 | | | |
| Resin solution of Comp. Ex. 1 | | | | | 100 | | |
| Resin solution of Comp. Ex. 2 | | | | | | 100 | |
| Resin solution of Comp. Ex. 3-2 | | | | | | | 100 |
| Hand feeling | A | A | A | A | A | A | A |
| Chemical resistance | A | A | A | A | C | C | C |
| Surface abrasion resistance | A | A | A | A | B | C | B |
| Thermal softening temp. (° C.) | 208 | 210 | 208 | 210 | 115 | 110 | 135 |
| Environmental responsiveness | A | A | A | A | A | B | B |

INDUSTRIAL APPLICABILITY

According to the present invention, there is provided a self-crosslinking, polysiloxane-modified, polyhydroxy polyurethane resin, which is a useful material considered to contribute to the resolution of problems such as global warming and resource depletion and is effectively usable for industrial applications. Described more specifically, according to the present invention, there is provided a self-crosslinking, polysiloxane-modified, polyhydroxy polyurethane resin that formed products can also sufficiently satisfy in performance such as heat resistance, lubricity, non-tackiness, abrasion resistance and chemical resistance although they are environment-responsive products which contain carbon dioxide incorporated therein and can contribute to the reduction of warming gas. Therefore, the self-crosslinking, polysiloxane-modified, polyhydroxy polyurethane resin has utility in a wide range, and is expected to find extensive utility in various fields.

The imitation leather according to the present invention is characterized in that it used, as its forming material, the resin composition for leathers. The imitation leather is, therefore, provided with superb performance, including not only excellent scratch resistance, abrasion resistance, chemical resistance and heat resistance owing to the formation of a crosslinked resin through the reaction between isocyanate groups demasked under heat from masked isocyanate groups contained in the structure of the resin and hydroxyl groups contained in the resin, but also suppleness and lubricity owing to the effects of polysiloxane segments.

As the self-crosslinking, polysiloxane-modified, polyhydroxy polyurethane resin, which is a principal component of the resin composition for use in the present invention, is a useful material which contains carbon dioxide incorporated and fixed therein and contributes to the resolution of problems such as global warming and resource depletion, an imitation leather which is obtained by using the material can also provide products responsive to environmental conservation, the provision of which has not been realized with conventional products. Extensive use of the imitation leather is, therefore, expected to contribute to the conservation of the global environment.

The invention claimed is:

1. A self-crosslinking, polysiloxane-modified, polyhydroxy polyurethane resin,
    wherein the self-crosslinking, polysiloxane-modified, polyhydroxy polyurethane resin comprises a polysiloxane-modified, polyhydroxy polyurethane resin and has masked isocyanate groups in a structure of the polysiloxane-modified, polyhydroxy polyurethane resin,
    the polysiloxane-modified, polyhydroxy polyurethane resin is derived from a reaction of a 5-membered cyclic carbonate compound and an amine-modified polysiloxane compound and has polysiloxane segments therein.

2. The self-crosslinking, polysiloxane-modified, polyhydroxy polyurethane resin according to claim 1,
    wherein the 5-membered cyclic carbonate compound is a reaction product of an epoxy compound and carbon dioxide, and contains, in a structure thereof, the carbon dioxide in a range from 1 to 25 mass %.

3. The self-crosslinking, polysiloxane-modified, polyhydroxy polyurethane resin according to claim 1,
    wherein a content of the polysiloxane segments in a molecule of the polysiloxane-modified, polyhydroxy polyurethane resin is in a range from 1 to 75 mass %.

4. The self-crosslinking, polysiloxane-modified, polyhydroxy polyurethane resin according to claim 1,
    wherein the masked isocyanate groups are reaction products of organic polyisocyanate groups and a masking agent,
    the masked isocyanate groups are demasked and form isocyanate groups when subjected to a heat treatment, and
    the resulting isocyanate groups are reactable with hydroxyl groups in a structure of the self-crosslinking, polysiloxane-modified, polyhydroxy polyurethane resin so as to induce self-crosslinking.

5. A process for producing the self-crosslinking, polysiloxane-modified, polyhydroxy polyurethane resin according to claim 1, comprising:
    in the presence of a modifier having at least one free isocyanate group and at least one masked isocyanate group, reacting the at least one free isocyanate group of the modifier with hydroxyl groups in the polysiloxane-modified, polyhydroxy polyurethane resin, so as to obtain the polysiloxane-modified, polyhydroxy polyurethane resin having masked isocyanate groups in the structure thereof, wherein the polysiloxane-modified, polyhydroxy polyurethane resin has been derived from the reaction of the 5-membered cyclic carbonate compound and the amine-modified polysiloxane compound and has the polysiloxane segments therein.

6. The process according to claim 5, wherein the 5-membered cyclic carbonate compound is a reaction product of an epoxy compound and carbon dioxide, and the carbon dioxide is contained in the 5-membered cyclic carbonate compound in a range from 1 to 25 mass % in the polysiloxane-modified, polyhydroxy polyurethane resin derived from the reaction of the 5-membered cyclic carbonate compound and the amine-modified polysiloxane compound.

7. The process according to claim 5, wherein the modifier is a reaction product of an organic polyisocyanate compound and a masking agent.

8. A resin material comprising the self-crosslinking, polysiloxane-modified, polyhydroxy polyurethane resin according to claim 1 and another binder resin blended therewith.

9. An imitation leather comprising:

a base fabric; and a resin composition impregnated in or laminated on the base fabric, wherein the resin composition comprises, as a principal component, a self-crosslinking, polysiloxane-modified, polyhydroxy polyurethane resin, said self-crosslinking, polysiloxane-modified, polyhydroxy polyurethane resin comprises a polysiloxane-modified, polyhydroxy polyurethane resin and has masked isocyanate groups in a structure of the polysiloxane-modified, polyhydroxy polyurethane resin, the polysiloxane-modified, polyhydroxy polyurethane resin is derived from a reaction of a 5-membered cyclic carbonate compound and an amine-modified polysiloxane compound and has polysiloxane segments therein.

10. The imitation leather according to claim 9, wherein the 5-membered cyclic carbonate compound is a reaction product of an epoxy compound and carbon dioxide, and the carbon dioxide is contained in a range from 1 to 25 mass % in a structure of the self-crosslinking, polysiloxane-modified, polyhydroxy polyurethane resin.

11. The imitation leather according to claim 9, wherein a content of the polysiloxane segments in a molecule of the self-crosslinking, polysiloxane-modified, polyhydroxy polyurethane resin is in a range from 1 to 75 mass %.

12. The imitation leather according to claim 9, wherein the masked isocyanate groups are reaction products of organic polyisocyanate groups and a masking agent, the masked isocyanate groups are demasked and form isocyanate groups when subjected to a heat treatment, and the resulting isocyanate groups are reactable with hydroxyl groups in a structure of the self-crosslinking, polysiloxane-modified, polyhydroxy polyurethane resin so as to induce self-crosslinking.

13. The imitation leather according to claim 9, wherein the resin composition further comprises another resin.

\* \* \* \* \*